United States Patent [19]
Wagner

[11] B 3,918,527
[45] Nov. 11, 1975

[54] CABLE CONTROLLED DRAFT LOAD AND POSITION SENSING LINKAGE

[75] Inventor: Robert J. Wagner, Milwaukee, Wis.

[73] Assignee: Allis-Chalmers Corporation, Milwaukee, Wis.

[22] Filed: May 31, 1973

[21] Appl. No.: 365,490

[44] Published under the Trial Voluntary Protest Program on January 28, 1975 as document no. B 365,490.

[52] U.S. Cl. ................................................. 172/9
[51] Int. Cl.² ...................................... A01b 63/112
[58] Field of Search .......................... 172/7, 9, 4, 10

[56] References Cited
UNITED STATES PATENTS
2,974,733  3/1961  Fletcher................................ 172/7
3,575,241  4/1971  McKeon et al. ....................... 172/7

*Primary Examiner*—Stephen C. Pellegrino
*Attorney, Agent, or Firm*—Arthur L. Nelson

[57] ABSTRACT

A cable controlled linkage for draft load and implement position sensing in a weight distribution system on a tractor. The cables transmit manual control signals while the sheaths of the cables transmit a feedback signal from a position sensing linkage responsive to position changes of the implement and a feedback signal from a draft load sensing linkage responsive to draft load changes.

14 Claims, 4 Drawing Figures

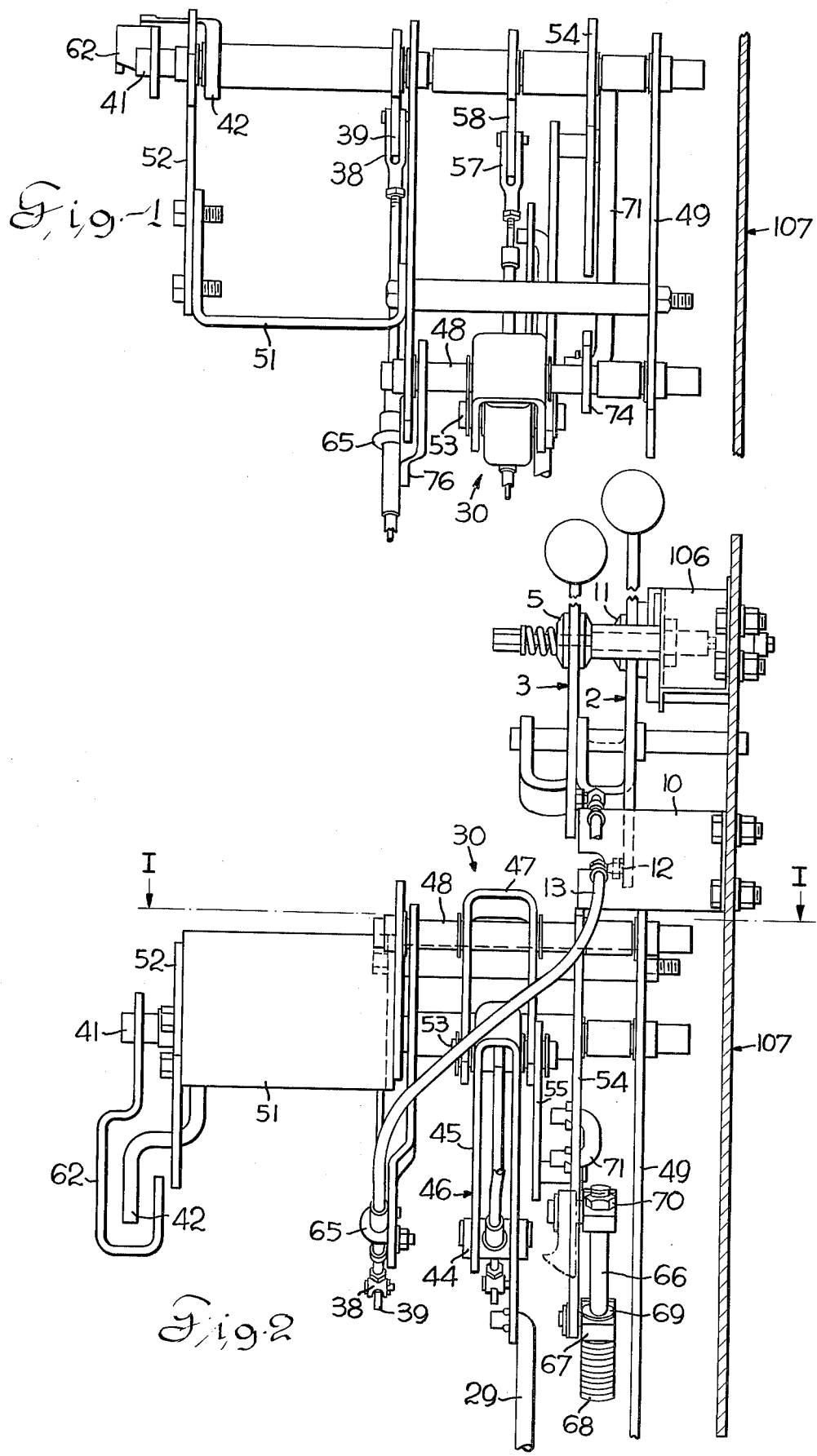

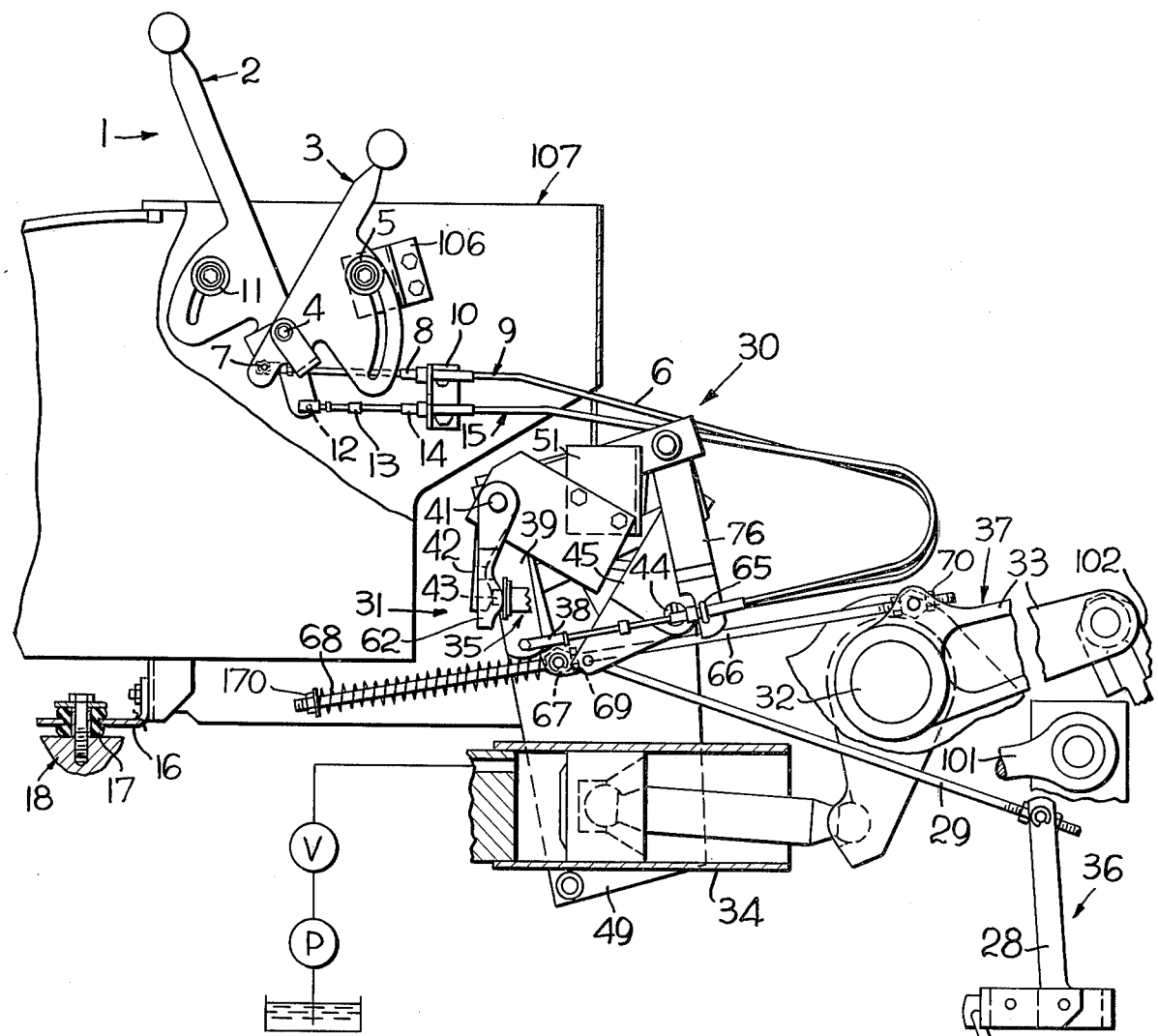
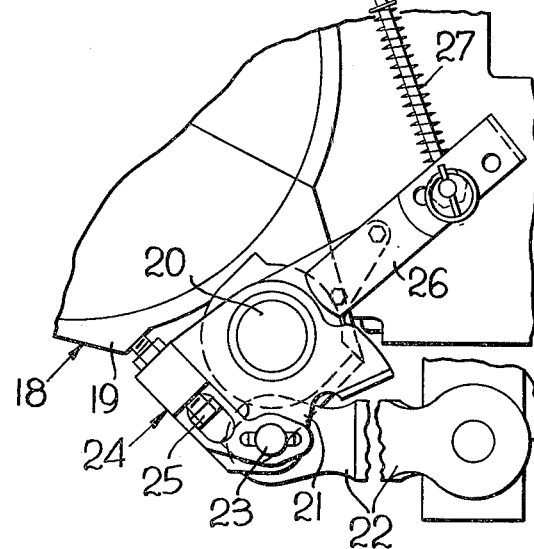
Fig. 3

CABLE CONTROLLED DRAFT LOAD AND POSITION SENSING LINKAGE

This invention relates to a draft load and position control on a tractor and more particularly to cable operators for transmitting a signal from the manual control levers and cable sheaths for providing feedback signals responsive to changes in the implement position and changes responsive to the draft load.

Tractors operating in connection with an implement often include a hydraulic weight distribution system which operates in response to draft loads. This type of a system senses a draft load preferably in a mechanical manner and initiates a signal which in turn controls a hydraulic valve to control the raising and lowering of the implement responding to the draft load. If the draft load is excessive the signal from the lower draft arms is transmitted through a linkage to open the hydraulic valve and allow pressurized fluid to operate a ram and thereby lift the implement and vice versa. The system controls the implement height in response to draft load. Theoretically, a relatively constant draft load is maintained on the draft arms of a three-point hitch on the tractor even though the soil conditions may vary. This system, however, does have some shortcomings and an added refinement to the system is provided by a position control linkage which operates in response to the relative position of the implement.

A position control linkage may be preset manually to provide a constant depth of the implement which is pulled by the tractor. This in some instances is quite satisfactory even though the soil conditions may vary. Neither one of the systems provides a satisfactory operation under all conditions and accordingly a combination of the two systems can provide improved operation and assure satisfactory operating conditions under most all operating circumstances.

The draft load sensing system provides for a constant draft load of the implement on the tractor. Although theoretically this may seem quite satisfactory, the system sometimes over-reacts for some soil conditions. Accordingly, a feedback linkage from the implement position sensing is also transmitted to operate the hydraulic valve to assure that the draft load sensing system does not over-react. An adjustment of the feedback systems can also be provided to adjustably vary the compensating reaction of the position control linkage while the draft control linkage is also operating to assure the best operating conditions regardless of soil conditions.

With the advent of resiliently supported platforms and resiliently supported cabs on the tractor, the rigid linkage between the manual control levers and the draft load and position sensing linkages are not satisfactory. Since the platform and operating station on the tractor which carries the control levers shifts relative to the chassis of the tractor which supports the sensing linkages, it is necessary to provide a flexible connecting means between them. Accordingly, cable members are provided between the manual controls at the operator station and the draft load sensing linkage and a position control sensing linkage mounted on the tractor chassis. This invention provides such a linkage which can operate either a draft load sensing system or a position control sensing system or a combination of both systems.

It is an object of this invention to provide a cable controlled draft load and position control linkage on a tractor.

It is another object of this invention to provide cable controlled draft load and position sensing whereby the manual controls transmit a control signal through cables, and feedback signals are transmitted through a compensating mechanism and the cable sheaths to operate a hydraulic valve of a weight distribution system.

It is a further object of this invention to provide a cable controlled hydraulic weight distribution system whereby the cable transmits a manual operating signal and the cable sheath transmits draft load sensing and implement position sensing signals from the implement hitch to the hydraulic valve of a hydraulic weight distribution system on a tractor.

The objects of this invention are accomplished by providing manual control means at the operator station which is resiliently supported on the vehicle chassis. The control levers include a position control lever and a draft load control lever which each transmit a manual signal through a sheathed cable to the means for actuating the hydraulic valve of a weight distribution system. The sheath of the cables are mounted as are the control levers on a mounting at the operator station and the cables extend to the valve control means which is mounted rigidly on the chassis of the vehicle. It is understood that the operator station is supported through resilient means mounted on the chassis to resiliently support the operator station with relation to the vehicle chassis.

The tractor is provided with an implement hitch and means for raising and lowering the implement and also means for connecting the draft load of the implement to the tractor such as lower draft arms of a three-point hitch. The hydraulic weight distribution system includes a source of pressurized fluid, a hydraulic control valve and a hydraulic ram for raising the implement in response to a position control or draft control signals. A feedback linkage is connected for transmission of the draft load signal from the lower draft arms or the implement position control signal from the implement lifting means which in turn is transmitted through the hydraulic valve compensating means. The valve operating mechanism includes a valve operating shaft and arms pivotally mounted on the shaft. The valve compensating means includes a compensating shaft carrying levers, and the sheath of each cable is connected to a lever on the compensating shaft. Through interconnecting links between the levers on the valve actuating shaft and the valve compensating shaft, the feedback signal from the draft load sensing linkage and the position control sensing linkage is transmitted to compensate the actuation of the valves of the hydraulic weight distribution system of the tractor. The system can be operated by maintaining a constant implement depth or a constant implement draft load on the tractor or a combination of both systems to provide the most optimum operating conditions in the field.

The preferred embodiment of this invention is illustrated in the attached drawings.

FIG. 1 illustrates a plan view of the valve actuating and valve compensating mechanism and the cable connections, taken along line I—I of FIG. 2.

FIG. 2 is a rear view of the manual controls, the cable connections, the draft load linkages and the implement position linkages connected to the valve compensating and actuating mechanisms.

FIG. 3 is a side elevation view of the manual controls, the cable connections to the draft load sensing linkage and the implement position sensing linkage for operating the hydraulic valve of a hydraulic weight distribution system on a tractor.

Figure 4:
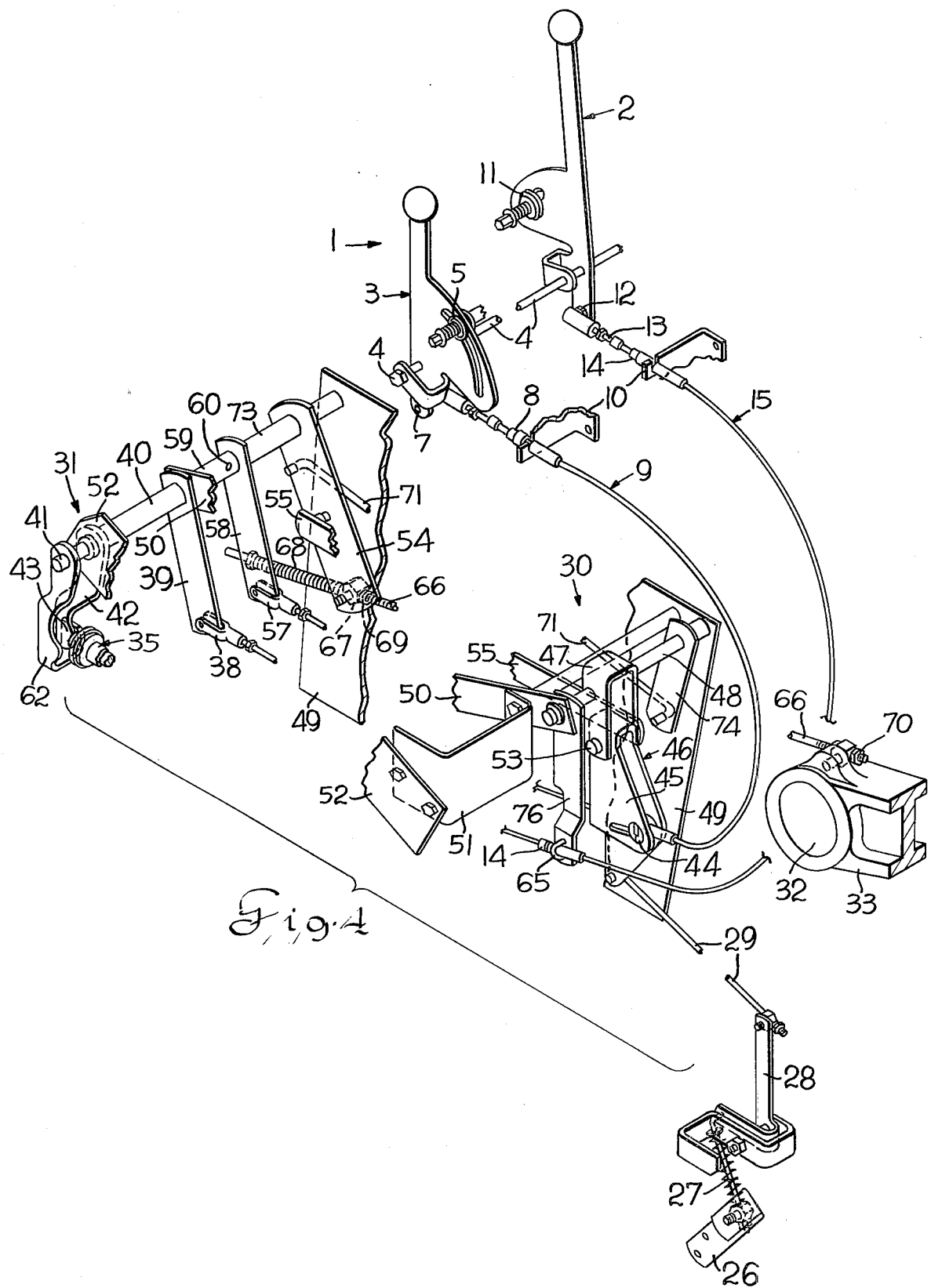
FIG. 4 is a three-dimensional view of the hydraulic valve operating mechanism and the valve compensating mechanism and means for controlling the hydraulic valve of a hydraulic weight distribution system on a tractor.

Referring to the drawings, manual control means 1 includes a position control lever 2 and a draft load control lever 3 pivotally mounted on the pin 4. The draft load control lever 3 includes a friction brake 5 supported on the brackets 106 which in turn is carried on the control panel 107. A draft load control lever 3 pivotally connects the cable 6 by means of a bolt 7. The sheath 8 of the sheathed cable 9 is mounted on the bracket 10 which in turn is supported on the control panel 107.

Position control lever 2 also carries a friction brake 11 which resists the pivotal movement of the position control lever 2. The position control lever 2 is pivotally connected by the pin 12 to the cable 13. The cable 13 slides through the sheath 14 of the sheathed cable 15. The sheath 14 is mounted on the bracket 10 of the control panel 107.

The control panel 107 is mounted on the bracket 16 and other similar brackets which are resiliently supported by resilient isolators 17 of which one is shown and which in turn are supported on the chassis 18 to provide resilient mounting of the control panel 107.

The chassis 18 of the tractor forms a rear end housing 19 which carries a torsion bar 20, a pair of ears 21 extend downwardly from a torsion bar 20 to form connection for a pair of lower draft arms 22 of which only one is shown in the drawings. Ear 21 is connected to the lower draft arm 22 by the pin 23. Since one end of the torsion bar 20 is splined to the rear end housing 19 while the other end is splined to the ears 21 a torque is created in the bar as a draft load on the draft arms 22 is applied to the tractor. The preload torque adjusting means 24 includes a means presetting a torque load on the torsion bar by tightening of the bolt 25.

The ears 21 are integral with the sensing arm 26 which is connected through the link 27 to the bell crank 28. A draft load on the draft arms 22 causes a displacement signal to be initiated by the sensing arm 26 and transmitted through the link 27 and bell crank 28 to the rod 29 to the valve compensating mechanism 30. The valve compensating mechanism is interconnected with the valve operating mechanism 31 which will be described subsequently.

The rear end housing 19 of the chassis 18 also forms a support for a rock shaft 32. The rock shaft 32 carries a pair of rock arms 33 which are connected to lift links 102 for lifting the lower draft arms 22. The lower draft arms 22 and an upper link 101 are adapted for connection to the implement for raising and lowering of the implement in response to operation of the ram 34 which is connected to the hydraulic valve 35 of the weight distribution system.

Accordingly, the draft load sensing linkage 36 transmits a signal responsive to the draft load while the position control linkage 37 transmits an implement position signal responsive to the implement displacement.

The position control lever 2 initiates a manual signal through the cable 13 of the sheathed cable 15 which is connected on its other end through the clevis 38 to the lever 39. The lever 39 is integral with the quill shaft 40 which is rotatably positioned on the valve actuating shaft 41. The quill shaft 40 is also integral with shaft 41. The quill shaft 40 is also integral with the vavle operating arm 42 which engages the end of the spool 43 of the control valve 35. The sheath 14 is connected by the cable connector 65 to the lever 76 which is integral with a compensator shaft 48.

The rock arms 33 on the rock shaft 32 are connected to the rod 66 by joint 70 for transmitting a feedback displacement signal through the connector 67 to the lever 54. A spring 68 provides an overtravel arrangement to allow a connector 67 to slide against the spring to permit axial movement of the connector 67 from the stop 69 on the rod 66 toward the stop formed by the nut 170 on the end of the rod 66.

Link 71 is pivotally connected between lever 54 on the busing 73 which pivots on the valve actuating shaft 41 and the lever 74 which pivots with the compensating shaft 48. The feedback signal transmitted through the rod 66 is transmitted through the link 71 to the lever 74 through the compensating shaft 48 to lever 76 to move the sheath 14 in response to the feedback position signal from the rock shaft. Likewise, as lever 54 is pivoted the link 55 shifts the pivot point of the lower link 45 of the articulate lever 46 about the axis of pin 53. This compensates for movement of the implement as the draft load signal causes the valve 35 to open and the ram 34 to raise the implement.

The draft control lever 3 is connected through the cable 6 of the sheathed cable 9 to the clevis 57 which pivotally connects to the lever 58. The lever 58 is integral with the bushing 59 and is connected by means of a pin 60 to the valve actuating shaft 41. As the lever 58 is rotated, the shaft 41 is also rotated which pivots the valve actuating arm 62.

Sheath 8 of sheathed cable 9 is connected through a cable connector 44 to the lower link 45 of the articulated lever 46. The articulated lever 46 includes the upper link 47 which is pivotally mounted on the compensator shaft 48. The supporting structure for the valve operating shaft 41 and the quill shaft 40 includes the wall 49 which is supported on the chassis for supporting the right-hand end of the valve operating shaft 41 and the compensator shaft 48. The opposite ends of the valve operating shaft 41 and the compensator shaft 48 are supported in the metal strap 50 which is connected to the bracket 51 in the end plate 52 which in turn is supported on the vehicle chassis.

The articulate lever 46 is pivotally supported on the compensator shaft 48 and an upper link 47 pivots on the shaft 48. A lower link 45 of the articulating lever 46 pivots on the pin 53 which is also pivotally connected to the lever 54 by means of the link 55.

The operation of a preferred embodiment of the cable controlled draft load and position sensing linkage described above will be set forth in the following paragraph.

The cable controlled sensing linkage described above operates in the following manner. When the position control lever 2 and the draft control lever 3 are rotated forwardly to their extreme forward position the valve actuating arms 62 and 42 are inactivated and the weight distribution system is not in operation. When the operator desires to operate either of the draft control or the position control linkages the selected manual lever is moved rearwardly. Either the position control or the draft control lever is operated or both of the systems may be operated simultaneously.

As the position control lever 2 is moved rearwardly the cable 13 is moved forwardly on the lower portion of the position control lever 2. This rotates the lever 39 and the valve actuating arm 42 counterclockwise as the cable 13 slides through the sheath 14 of the sheathed cable 15. The valve actuating arm 42 engages the valve spool 43 to regulate the implement position at a predetermined depth. If the implement should vary from the predetermined position by moving upwardly then the rock arms 33 will rotate about the rock shaft 32. The rod 66 connected to the rock arms 33 will cause the pushrod 66 to move forwardly and rotate lever 54 in a clockwise direction. This in turn causes the link 71 to rotate the lever 74 in a clockwise direction together with the compensating shaft 48. Compensating shaft 48 is integral with the lever 76 and accordingly this carries the lower end of the sheath 14 of the sheathed cable 15 forwardly. This in turn moves the clevis 38 connected to the lever 39 forwardly and causes the lever 39 and the valve actuating arm 42 to rotate in a clockwise direction. The clockwise movement of the valve actuating arm 42 will reduce the flow through of the pressurized fluid and cause the rock arms 33 to lower which in turn lowers the implement. This restores the implement to its original preset position.

If the implement position is changed from its preset position and lowered causing a pushrod 66 to move rearwardly, this causes a counterclockwise movement of the lever 54 and a lever 74 on the compensating shaft 48. This in turn causes a counterclockwise rotation of a lever 76 and a retraction of the clevis 38 connected to lever 39. Lever 39 and the valve actuating arm 42 also rotate in counterclockwise direction causing a greater flow of pressurized fluid through the hydraulic valve as the spool 43 is moved rearwardly. This in turn causes a flow of pressurized fluid to the rams 34 and causes the rock arms 33 to rotate in a counterclockwise direction and the implement is correspondingly lifted to its original preset position.

When the draft control lever 3 pivots rearwardly the lower end of the lever 3 moves forwardly and the cable 6 slides forwardly through the sheath 8. Correspondingly, the clevis 57 moves rearwardly and the lever 58 rotates counterclockwise. The sheath 8 is fixed in the lower link 45 of the articulated lever 46 which remains stationary since the upper end of the sheath 8 of the sheath cable 9 is fixed relative to a mounting of the lever 3. As the lever 58 moves counterclockwise, the valve actuating shaft 41 also moves counterclockwise together with the valve actuating arm 62. The operator selects the draft control position for a predetermined draft load on the lower draft arms 22.

As the draft load on the lower draft arms 22 increases the torsion bar 20 rotates counterclockwise on its axis causing the sensing arm 26 to rotate in the same direction. This in turn causes the bellcrank 28 to rotate in a clockwise direction. The bellcrank 28 is connected to the rod 29 which in turn causes the lower link 45 of the articulated lever 46 to rotate on its axis of the pin 53 in a counterclockwise direction. The sheath 8 of the sheathed cable 9 is fixed in the lower link 45 by the connector 44. It is moved rearwardly which in turn carries the clevis 57 rearwardly to rotate the lever 58 and the actuating arm 62 in a counterclockwise direction. This in turn causes the valve spool 43 to move to the rear to increase the flow of pressurized fluid through the valve to the hydraulic rams 34 to lift the implement and restore the original draft load of the implement on the tractor. Simultaneously with this operation the position control linkage is also operating. As the implement is raised, the pushrod 66, which is connected to the rock arms 33, is moved in the forward direction causing the pivotal rotation of the lever 54. A link 55 is pivotally connected in the lever 54 and connected through the pin 53 in the articulated lever 46 causing the lever 54 and that of the upper link 47 of the articulated lever 46 to rotate in a clockwise direction. This moves the pivot point of the lower link 45 of the articulated lever 46 to move forwardly. This in turn causes the lower link 45 to rotate on the axis of its connection with the pushrod 29 and move the cable sheath connector 44 together with the clevis 57 forwardly. The lever 58 on the valve actuating shaft 41 and valve actuating arm 62 pivot clockwise in a forward direction. The position sensing linkage prevents overcompensation from the draft load sensing linkage.

When the implement is operating under the draft control and the draft load on the lower draft arms is reduced, the sensing arm 26 is rotated in a clockwise direction. This in turn causes the bellcrank 36 to rotate in a counterclockwise direction and the lower link 45 of the articulated lever 46 to rotate in a clockwise direction. With the rotation on the lower link 45 in a clockwise direction, the sheath 8 of the sheathed cable 9 held in the cable connector 44 moves forwardly. This in turn causes the clevis to rotate the lever 58 and the actuating valve shaft 41 and the actuating arm 62 to rotate in a clockwise direction. The valve spool 43 follows the actuating arm 62 in response to a spring in the valve. As the valve spool 43 moves forwardly the valve decreases the flow of pressurized fluid to the hydraulic rams 34 causing a lowering of the and restoring the position of the implement to increase the draft load on the lower draft arms. Similarly the position control linkage operates through the rock arms 33 and the pushrod 66 to rotate the lever 54 and the upper link 47 on the articulated lever 46 to rotate in a counterclockwise direction. This in turn causes the cable sheath 8 of the sheathed cable 9 to move the clevis 57 rearwardly and compensate for over-reaction of the draft load sensing unit. A provision for one of a number of holes in the lever 54 is provided to control the feedback through the position control linkage to adjust the compensation through the position control linkage in accordance with the variation in soil conditions.

It is understood that the valve spool 43 is spring-biased forwardly in its valve assembly. When the valve actuating arms 42 and 62 are moved forwardly, the spool 43 will move forwardly to a neutral position in which pressurized fluid flow through the valve is blocked. The degree of flow through the valve is controlled by the rearward movement of the spool in the valve assembly.

The draft control linkage and the position control linkage operation has been described in the above paragraphs. It is understood that a combination of the position control and draft control can be provided by actuating both the levers 2 and 3. The degree of control by each of the two levers is determined by the degree of rotation of each lever. Essentially, the position control lever 2 controls the maximum depth of the implement when it is in the operating position. The draft control lever 3 controls the maximum draft load on the lower draft arms exerted by the implement as it is being pulled by the tractor.

The embodiments of the invention in which an exclusive property or privilege is claimed are defined as follows:

1. A control mechanism on a tractor adapted for operating a hydraulic valve of a hydraulic weight distribution system comprising, valve actuating means, implement hitching means adapted for connection to an implement, manual control means including at least one of an implement position control and a draft load control, at least one of draft load sensing means and implement position sensing means connected to said implement hitching means, at least one pair of flexible elements including a guided element and a guiding element slidably movable relative to each other, means connecting the first of said flexible elements between said manual control means and said valve actuating means for adjustably positioning said valve actuating means, valve compensating means connected to said valve actuating means, means connecting at least one of said draft control sensing means and said position control sensing means through the second of said flexible elements to said valve compensating means to thereby provide a compensating movement to said valve compensating means to modify the movement of said valve actuating means during valve actuation.

2. A control mechanism on a tractor adapted for operating a hydraulic valve of a hydraulic weight distribution system as set forth in claim 1 wherein said implement hitching means includes a three-point hitch including a pair of lower draft arms adapted for connection to an implement.

3. A control mechanism on a tractor adapted for operating a hydraulic valve of a hydraulic weight distribution system as set forth in claim 1 wherein said implement hitching means includes an implement positioning means adapted for raising and lowering of the implement, means connecting said implement positioning means to said implement position sensing means.

4. A control mechanism on a tractor adapted for operating a hydraulic valve of a hydraulic weight distribution system as set forth in claim 1 wherein said valve actuating means includes pivotally mounted valve actuating arms, said valve compensating means includes pivotally mounted compensating arms operating in response to implement position and draft load to compensate the valve actuating means.

5. A control mechanism on a tractor adapted for operating a hydraulic valve of a hydraulic weight distribution system as set forth in claim 1 wherein said implement hitching means includes an implement positioning means, said implement position sensing means connected to said implement positioning means, a draft member, said draft load sensing means connected to said draft member, means connecting said implement position sensing means to said valve compensating means through a second element of a first pair of said flexible elements and means connecting said draft load sensing means to said valve compensating means through a second element of a second pair of said flexible elements to thereby control said valve actuating means in response to draft load and implement position.

6. A control mechanism on a tractor adapted for operating a hydraulic valve of a hydraulic weight distribution system as set forth in claim 1 wherein said valve actuating means includes a pivotally supported valve actuator, said valve compensating means includes pivotally supported valve compensating means, said pair of flexible elements includes a sheathed cable having a sheath guiding a cable defining said guiding and said guided elements, means connecting said cable between said manual means and said valve actuating means, means connecting the sheath of said sheathed cable to said draft load sensing means and to said valve compensating means to thereby compensate said valve actuating means in response to draft loads on said hitching means.

7. A control mechanism on a tractor adapted for operating a hydraulic valve of a hydraulic weight distribution system as set forth in claim 1 wherein said pair of flexible elements includes a sheathed cable having a sheath guiding a cable, said first of said flexible elements includes the cable, said second of said flexible elements includes the sheath on said cable.

8. A control mechanism on a tractor adapted for operating a hydraulic valve of a hydraulic weight distribution system as set forth in claim 1 wherein said implement hitch means includes draft members adapted for connection to the implement, a feedback link connected to said draft members adapted for transmitting a feedback signal responsive to draft load to said valve compensating means.

9. A control mechanism on a tractor adapted for operating a hydraulic valve of a hydraulic weight distribution system as set forth in claim 1 wherein said implement hitching means includes a position control means adapted for positioning said implement, a feedback linkage connecting said implement positioning means to said valve compensating means to thereby feedback a position responsive signal to said valve compensating means.

10. A control mechanism on a tractor adapted for operating a hydraulic valve of a hydraulic weight distribution system as set forth in claim 1 wherein said valve actuating means includes pivotally mounted valve actuating levers, said valve compensating means includes pivotally mounted valve compensating levers, means connecting said pivotally mounted valve compensating levers with said valve actuating levers, means connecting said draft load sensing means to said valve compensating levers, means connecting said position control sensing means to said valve compensating levers thereby to compensate said valve actuating means in response to draft load signals and implement position signals.

11. A control mechanism on a tractor adapted for operating a hydraulic valve of a hydraulic weight distribution system as set forth in claim 1 including a first pair of said flexible elements defining a sheathed cable wherein a sheath forms the guiding element and a cable forms the guided element, said implement hitching means including a pair of rock arms pivotally mounted on said tractor, means connecting said sheath between said rock arms and said valve compensating means, a second pair of said flexible elements defining a second sheathed cable wherein a second sheath forms the guiding element and a second cable forms the guided element, said implement hitching means including draft arms, means connecting said second sheath between said draft arms and said valve compensating means.

12. A control mechanism on a tractor adapted for operating a hydraulic valve of a hydraulic weight distribution system as set forth in claim 1 including a first pair of said flexible elements wherein a cable defines the guided element and a sheath defines the guiding element, said implement hitching means including a pair of rock arms pivotally mounted on said tractor, means connecting said sheath with said valve compensating means to said rock arms, a second pair of said flexible elements wherein a second cable defines the guided element and a second sheath defines the guiding element, said implement hitching means including a pair of draft arms, means connecting said second sheath with said valve compensating means to said draft arms.

13. A control mechanism on a tractor adapted for operating a hydraulic valve of a hydraulic weight distribution system as set forth in claim 1 including a first pair of said flexible elements wherein a cable defines the guided element and a sheath defines the guiding element, a pair of rock arms pivotally mounted on said tractor, means connecting said sheath with said valve compensating means to said rock arms, a second pair of flexible elements wherein a second cable defines the guided element and a second sheath defines the guiding element, said implement hitching means including a pair of draft arms, said valve compensating means including an articulated lever having a first link and a second link, means connecting said second sheath with said second link of said articulated lever in said valve compensating means to said lower draft arms, means connecting said second cable between said manual control means and said first link of said articulated lever of said valve compensating means.

14. A control mechanism on a tractor adapted for operating a hydraulic valve of a hydraulic weight distribution system as set forth in claim 1 wherein said manual control means includes a draft load control lever, a position control lever, a first pair of flexible elements including a sheath and cable, means connecting said cable between said draft load control lever and said valve actuating means, a second pair of flexible elements defining a second sheath and cable, means connecting said second cable between said position control lever and said valve actuating means.

* * * * *